(12) United States Patent
Haberer et al.

(10) Patent No.: US 10,359,003 B2
(45) Date of Patent: Jul. 23, 2019

(54) CYLINDER HEAD GASKET WITH COMPRESSION LIMITER AND FULL BEAD LOADING

(71) Applicant: FEDERAL-MOGUL CORPORATION, Southfield, MI (US)

(72) Inventors: Tyler Haberer, Southfield, MI (US); Daniel J. Vialard, Canton, MI (US)

(73) Assignee: Tenneco Inc., Lake Forest, IL (US)

( * ) Notice: Subject to any disclaimer, the term of this patent is extended or adjusted under 35 U.S.C. 154(b) by 0 days.

(21) Appl. No.: 14/746,202

(22) Filed: Jun. 22, 2015

(65) Prior Publication Data
US 2015/0369170 A1    Dec. 24, 2015

Related U.S. Application Data

(60) Provisional application No. 62/015,839, filed on Jun. 23, 2014.

(51) Int. Cl.
*F02F 11/00*    (2006.01)
*F16J 15/08*    (2006.01)

(52) U.S. Cl.
CPC ......... *F02F 11/002* (2013.01); *F16J 15/0818* (2013.01); *Y10T 29/49828* (2015.01)

(58) Field of Classification Search
CPC ...... F16J 15/02; F16J 15/0818; F16J 15/0881; F16J 15/0887
See application file for complete search history.

(56) References Cited

U.S. PATENT DOCUMENTS

| 4,836,562 A | 6/1989 | Yoshino |
| 5,286,039 A | 2/1994 | Kawaguchi et al. |
| 5,294,134 A | 3/1994 | Kawaguchi et al. |

(Continued)

FOREIGN PATENT DOCUMENTS

| CN | 1486406 A | 3/2004 |
| CN | 1676912 A | 10/2005 |

(Continued)

OTHER PUBLICATIONS

International Search Report, dated Sep. 22, 2015 (PCT/US2015/037050).

*Primary Examiner* — Kristina R Fulton
*Assistant Examiner* — L. Susmitha Koneru
(74) *Attorney, Agent, or Firm* — Robert L. Stearns; Dickinson Wright, PLLC

(57) ABSTRACT

A multilayer gasket for establishing a gas and/or fluid-tight seal between a cylinder head and engine block of an internal combustion engine is provided. The gasket includes a pair of functional layers each presenting a full bead and a half bead. A single-piece stopper with a fold over adjacent the combustion chamber opening is disposed between the function layers. The stopper extends between a fifth edge and a sixth edge, wherein the sixth edge is disposed radially between the full beads and the half beads. The stopper can be cranked or coined in a location disposed between the fold over and the full beads. The stopper can also include a secondary fold over adjacent the sixth edge. A distance layer is optionally disposed between the stopper and one of the functional layers. The distance layer can also be cranked or coined between the fold over and the full beads.

6 Claims, 3 Drawing Sheets

(56) References Cited

U.S. PATENT DOCUMENTS

| | | | |
|---|---|---|---|
| 5,294,135 A | 3/1994 | Kubouchi et al. | |
| 5,348,315 A | 9/1994 | Kawaguchi et al. | |
| 5,584,490 A | 12/1996 | Inouc et al. | |
| 5,588,657 A | 12/1996 | Fujisawa et al. | |
| 5,669,615 A | 9/1997 | Hohe et al. | |
| 5,695,200 A | 12/1997 | Diez et al. | |
| 5,875,548 A | 3/1999 | Diez et al. | |
| 5,895,055 A | 4/1999 | Udagawa | |
| 5,927,724 A | 7/1999 | Maschmann et al. | |
| 6,135,459 A | 10/2000 | Hiramatsu et al. | |
| 6,206,381 B1 | 3/2001 | Ii et al. | |
| 6,220,606 B1 | 4/2001 | Kawaguchi et al. | |
| 6,257,591 B1* | 7/2001 | Abe | F16J 15/0806 277/591 |
| 6,315,303 B1 | 11/2001 | Erb et al. | |
| 6,431,554 B1 | 8/2002 | Miyamoto et al. | |
| 6,450,504 B2 | 9/2002 | Bleidt et al. | |
| 6,923,450 B2 | 8/2005 | Unseld et al. | |
| 6,926,282 B2 | 8/2005 | Werz et al. | |
| 6,957,815 B1 | 10/2005 | Incjong | |
| 6,969,072 B2* | 11/2005 | Foster | F02F 11/002 277/593 |
| 7,185,893 B2 | 3/2007 | Wampula et al. | |
| 7,374,177 B2 | 5/2008 | Tripathy et al. | |
| 7,422,218 B2 | 9/2008 | Fritz | |
| 7,815,197 B2 | 10/2010 | Ueta | |
| 7,909,337 B2 | 3/2011 | Ueta et al. | |
| 7,966,725 B2 | 6/2011 | Fritz | |
| 8,123,230 B2* | 2/2012 | Yoshijima | F16J 15/0825 277/593 |
| 8,646,783 B2 | 2/2014 | Fritz | |
| 2002/0180161 A1* | 12/2002 | Werz | B23P 19/084 277/591 |
| 2003/0075873 A1* | 4/2003 | Nakamura | F16J 15/0818 277/593 |
| 2004/0155412 A1 | 8/2004 | Ueta et al. | |
| 2005/0189724 A1* | 9/2005 | Schmitz | F16J 15/0825 277/592 |
| 2005/0218607 A1 | 10/2005 | Fujino et al. | |
| 2006/0061045 A1 | 3/2006 | Burg | |
| 2007/0090608 A1* | 4/2007 | Ueta | F16J 15/0818 277/593 |
| 2009/0200752 A1* | 8/2009 | Okano | F16J 15/0825 277/592 |
| 2011/0001295 A1* | 1/2011 | Egloff | F16J 15/0825 277/592 |
| 2012/0261889 A1 | 10/2012 | Henne et al. | |

FOREIGN PATENT DOCUMENTS

| | | |
|---|---|---|
| CN | 1952374 A | 4/2007 |
| CN | 103597257 A | 2/2014 |
| DE | 19654283 A1 | 6/1998 |
| DE | 102004011721 A1 | 10/2005 |
| EP | 0544951 | 12/1991 |
| EP | 0531076 | 8/1992 |
| EP | 0533357 | 8/1992 |
| JP | 04015372 | 5/1990 |
| JP | H11159621 A | 6/1999 |
| JP | 2000028001 A | 1/2000 |
| JP | 2000227047 A | 8/2000 |
| JP | 2001173789 A | 6/2001 |
| JP | 2008223581 A | 9/2008 |
| WO | 2006034263 A2 | 3/2006 |
| WO | 2013153569 A1 | 10/2013 |

* cited by examiner

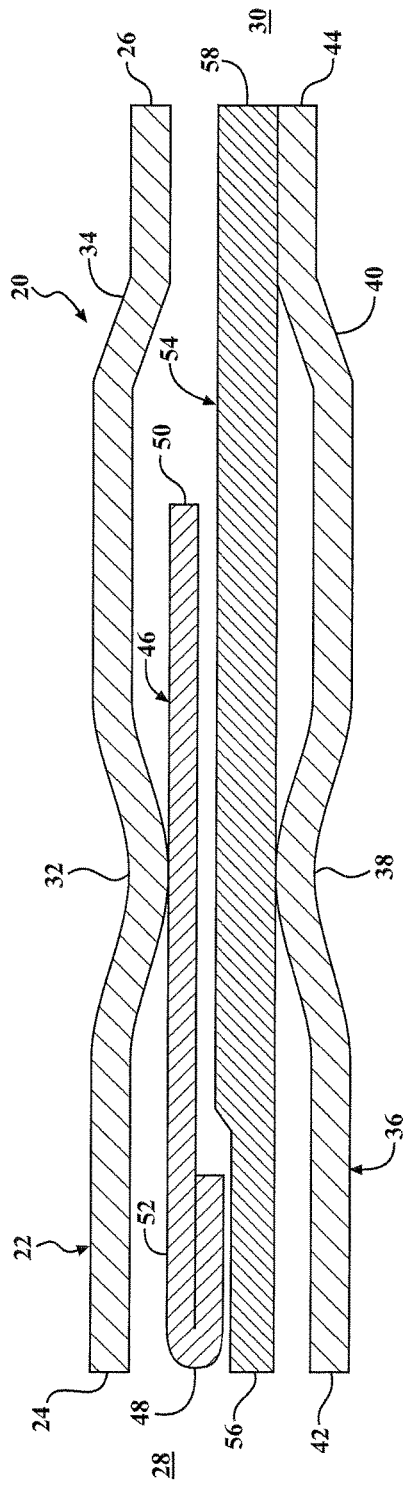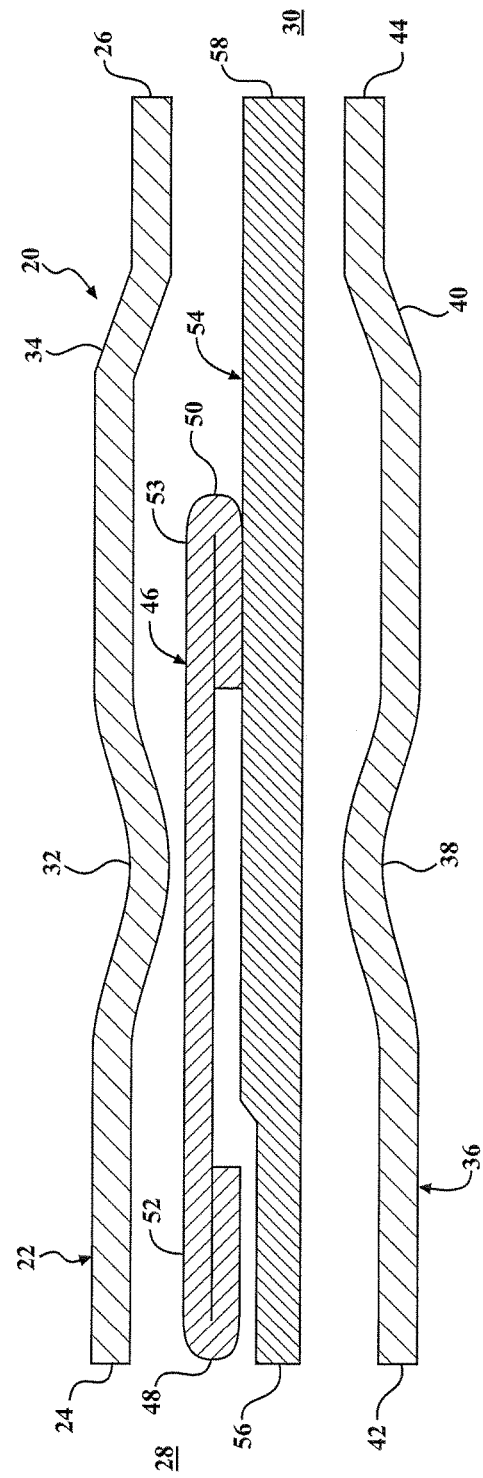

CYLINDER HEAD GASKET WITH COMPRESSION LIMITER AND FULL BEAD LOADING

CROSS REFERENCE TO RELATED APPLICATIONS

This U.S. patent application claims the benefit of U.S. provisional patent application Ser. No. 62/015,839 filed Jun. 23, 2014, the entire content of which is incorporated herein by reference.

BACKGROUND OF THE INVENTION

1. Field of the Invention

This invention relates generally to gaskets for providing a seal between two parts, and more particularly to multi-layer gaskets, such as cylinder head gaskets.

2. Related Art

Gaskets are typically used to establish a gas and fluid tight seal between two parts clamped together, such as a cylinder head and an engine block of an internal combustion engine. Such gaskets oftentimes include a functional layer having a sealing bead, also referred to as an embossment, to facilitate the tight seal. The functional layer with the sealing bead is typically provided along with one or more additional layers, and the multiple layers are compressed together between the two clamped parts, in order to establish the gas and fluid tight seal. However, if the gasket is over-compressed, damage to the sealing bead can occur. For example, if the bead becomes substantially flattened, it loses its ability to exert a high compression sealing pressure, and fatigue cracks can form in the area of the bead.

SUMMARY OF THE INVENTION

The invention provides a gasket, such as a cylinder head gasket of an internal combustion engine, providing improved fatigue life and sealing performance, and a method of manufacturing the gasket. The gasket includes a first functional layer extending from a first edge surrounding a combustion chamber opening to a second edge. A portion of the first functional layer extends in a first direction to present a first full bead around the combustion chamber opening, and a portion of the first functional layer extends in the first direction to present a first half bead disposed between the first full bead and the second edge. The gasket also includes a second functional layer extending from a third edge surrounding the combustion chamber opening to a fourth edge. A portion of the second functional layer extends in a second direction opposite the first direction to present a second full bead axially aligned with the first full bead, and a portion of the second functional layer extends in the second direction to present a second half bead axially aligned with the first half bead. A single-piece stopper is disposed between the functional layers and extends between a fifth edge and a sixth edge, wherein the sixth edge is disposed radially between the full beads and the half beads. The stopper also includes a fold over presenting an increased thickness between the fifth edge and the full beads. The gasket is able to provide improved performance under high loads and motion with only the single stopper, which is an advantage over other gasket designs which require multiple stopper layers.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a radial cross-sectional side view of a cylinder head gasket according to a third exemplary embodiment of the invention;

FIG. 4 is a radial cross-sectional side view of a cylinder head gasket according to a fourth exemplary embodiment of the invention.

DESCRIPTION OF THE ENABLING EMBODIMENTS

Figure 1:
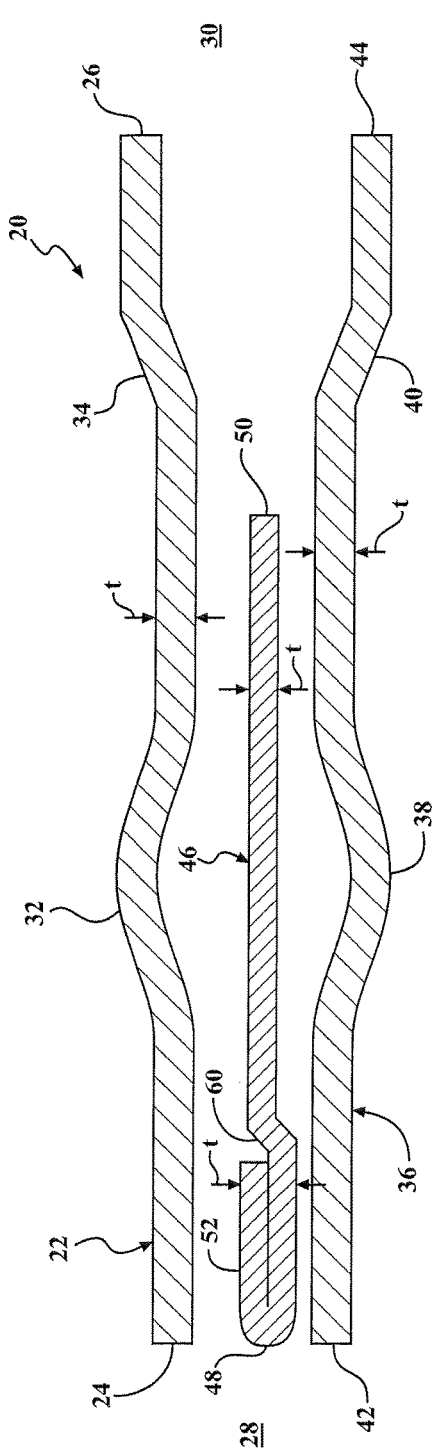
FIG. 1 is a radial cross-sectional side view of a cylinder head gasket according to a first exemplary embodiment of the invention.

A multilayer static gasket 20 is generally shown in FIGS. 1-5. The gasket 20 is typically used to establish a gas and/or fluid-tight seal between two components clamped together, such as a cylinder head and engine block of an internal combustion engine of a vehicle (not shown).

The gasket 20 includes a first functional layer 22 extending between a first edge 24 and a second edge 26. The first edge 24 surrounds a combustion chamber opening 28, and the second edge 26 typically surrounds another opening 30. The first functional layer 22 includes a first full bead 32 disposed between the first edge 24 and the second edge 26. This first full bead 32 is closer to the first edge 24 than the second edge 26, and it extends circumferentially and continuously around the first edge 24 and the combustion chamber opening 28. The first functional layer 22 is typically planar between the first edge 24 and the first full bead 32.

In the exemplary embodiment of FIG. 1, the first functional layer 22 extends outwardly to present the first full bead 32 and thus includes a convex outer surface and a concave inner surface along the first full bead 32. In the exemplary embodiments of FIGS. 2-4, the first functional layer 22 extends inwardly to present the first full bead 32 and thus includes a concave outer surface and a convex inner surface along the first full bead 32. The first functional layer 22 presents a thickness t between the inner and outer surfaces, and the thickness t is typically constant from the first edge 24 to the second edge 26.

The first functional layer 22 also includes a first half bead 34 disposed between the first full bead 32 and the second edge 26. The first half bead 34 typically extends circumferentially and continuously around the second opening 30. The first functional layer 22 is typically planar between the first full bead 32 and the first half bead 34. A portion of the first functional layer 22 is bent at an angle relative to the planar region to present the first half bead 34. In the exemplary embodiment of FIG. 1, the first half bead 34 of the first functional layer 22 extends outwardly in the same direction as the first full bead 32. In the exemplary embodiments of FIGS. 2-4, the first half bead 34 of the first functional layer 22 extends inwardly, like the first full bead 32. The first functional layer 22 is planar between the first half bead 34 and the second edge 26.

The gasket 20 also comprises a second functional layer 36 including a second full bead 38 axially aligned with the first full bead 32, and a second half bead 40 axially aligned with the first half bead 34. The second functional layer 36 extends continuously between a third edge 42, which is aligned with the first edge 24 of the first functional layer 22, and a fourth edge 44, which is aligned with the second edge 26 of the first functional layer 22. In the exemplary embodiment of FIG. 1, the second functional layer 36 extends outwardly away from the first functional layer 22 to present the second full bead 38 and thus includes a convex outer surface and a concave inner surface along the second full bead 38. In the exemplary embodiments of FIGS. 2-4, the second functional layer 36 extends inwardly to present the second full bead 38 and thus includes a concave outer surface and a convex inner surface along the second full bead 38. The second functional layer 36 also presents a thickness t between the inner and outer surfaces, and the thickness t is typically constant from the third edge 42 to the fourth edge 44. The thickness t of the second functional layer 36 is also typically equal to the thickness t of the first functional layer 22.

The second half bead 40 of the second functional layer 36 is axially aligned with the first half bead 34. The second half bead 40 is disposed between the second full bead 38 and the fourth edge 44 of the second functional layer 36. The second half bead 40 typically extends circumferentially and continuously around the second opening 30, like the first half bead 34. The second functional layer 36 is planar in a region between the second full bead 38 and the second half bead 40. A portion of the second functional layer 36 is bent at an angle relative to the planar region to present the second half bead 40. In the exemplary embodiment of FIG. 1, the second half bead 40 of the second functional layer 36 extends outwardly, in the same direction as the second full bead 38. In the exemplary embodiments of FIGS. 2-4, the second half bead 40 extends inwardly, like the second full bead 38. The second functional layer 36 is planar between the second half bead 40 and the fourth edge 44.

A single-piece stopper 46 is disposed horizontally along and axially between the first functional layer 22 and the second functional layer 36 for preventing over-compression of the full beads 32, 38. The gasket 20 of the present invention is able to achieve the improved fatigue performance and loading around the combustion chamber opening 28, with only the single stopper 46, which is an advantage over other gaskets which require multiple stopper layers. The stopper 46 extends from a fifth edge 48 to a sixth edge 50. The fifth edge 48 is axially aligned with the first edge 24 of the first functional layer 22 and the third edge 42 of the second functional layer 36, and thus surrounds the combustion chamber opening 28. The sixth edge 50 of the stopper 46, however, is not axially aligned with the second edge 26 of the first functional layer 22 or the fourth edge 44 of the second functional layer 36. Rather, the sixth edge 50 of the stopper 46, which is also referred to as a distal end, is located radially between the full beads 32, 38 and the half beads 34, 40.

The stopper 46 includes a fold over 52 located radially between the combustion chamber opening 28 and the full beads 32, 38. The fold over 52 extends from the fifth edge 48 to a location which is spaced radially from the full beads 32, 38, between the full beads 32, 38 and the combustion chamber opening 28. Before the stopper 46 is folded over, the thickness t of the stopper 46 is typically constant. Although there is no direct relation between the thickness t of the stopper 46 and the thickness t of the functional layers 22, 36, the thickness t of the stopper 46 (before the stopper 46 is folded over) is typically less than the thickness t of the first functional layer 22 and less than the thickness t of the second functional layer 36. In the finished gasket 20, the thickness t of the stopper 46 between the fold over 52 and the sixth edge 50 is typically less than the thickness t of the first functional layer 22 and less than the thickness t of the second functional layer 36.

Figure 2:
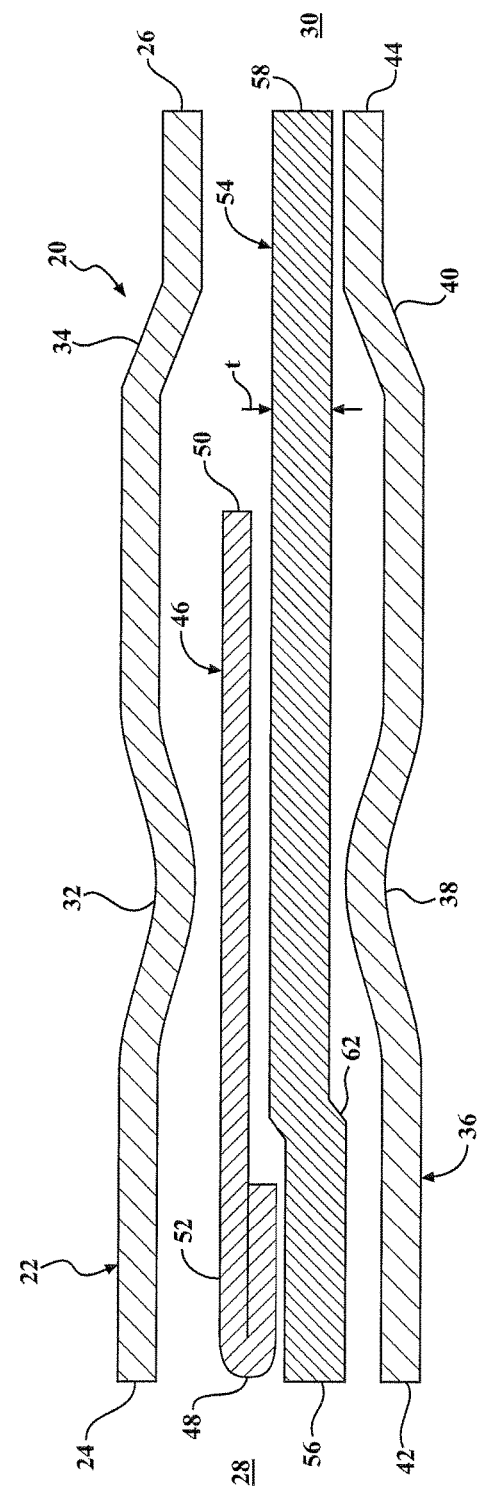
FIG. 2 is a radial cross-sectional side view of a cylinder head gasket according to a second exemplary embodiment of the invention.

The thickness t of the portion of the stopper 46 including the fold over 52, however, is greater than the thickness t of the adjacent portion of the stopper 46. The thickness t of the fold over 52 is also typically less than or equal to two times the thickness t of the adjacent portion of the stopper 46. The stopper 46 can be folded toward the first functional layer 22, as shown in FIG. 1, or toward the second functional layer 36, as shown in FIGS. 2-4. The stopper 46 can also be cranked, as shown in FIG. 1, or coined, as shown in FIG. 2, in which case the thickness t of the stopper 46 varies. In the example embodiment of FIG. 2, the coined stopper 46 has a reduced thickness t in the portion extending radially along and slightly past the fold over 52. The coined region ends between the fold over and the full beads 32, 38. Alternatively, the gasket 20 of FIG. 2 could be designed with the stopper 46 shown in FIG. 3, which is not cranked or coined.

The fold over 52 of the stopper 46 providing the increased thickness t around the combustion chamber opening 28 functions as a compression limiter. The unfolded region of the stopper 46 also provides some extra material along the full beads 32, 38, which improves loading on the full beads 32, 38 by increasing the line load on the full beads 32, 38. Accordingly, the stopper 46 can improve fatigue life of the gasket 20 and sealing around the combustion chamber opening 28 with the advantage of a single-piece design.

The stopper 46 can also include a secondary fold over 53 located adjacent the sixth edge 50, as shown in FIG. 4, to improve loading on the primary fold over 52. This secondary fold over 52 can be used in combination with any of the stopper designs. The stopper 46 of FIG. 4 with the primary and secondary fold overs 52, 53 is also referred to as a fold over backland stopper.

In the example embodiment of FIG. 1, the gasket 20 consists of only the functional layers 22, 36 and the stopper 46. In this case, the stopper 46 is the only component disposed between the functional layers 22, 36, and the desired compression and loading is achieved by the stopper 46 alone. However, the gasket 20 can include additional layers. For example, the gasket 20 can include a distance layer 54, as shown in the embodiments of FIGS. 2-4, to achieve the desired compression and loading on the full beads 32, 38. The distance layer 54 is disposed horizontally along and longitudinally between the stopper 46 and one of the functional layers 22, 36. In the embodiments of FIG. 2-4, the distance layer 54 is disposed between the stopper 46 and the second functional layer 36. The distance layer 54 extends from a seventh edge 56 axially aligned with the first edge 24 of the first functional layer 22 and surrounding the combustion chamber opening 28 to an eighth edge 58 axially aligned with the second edge 26 of the first functional layer 22 and surrounding the second opening 30. The distance layer 54 is typically cranked, as shown in FIG. 2, and/or coined, as shown in FIGS. 3 and 4. In this case, the thickness t of the distance layer 54 may be constant or vary between the seventh edge 56 and the eighth edge 58. The majority of the distance layer 54 has a thickness t which is typically greater than the thickness t of the stopper 46 and greater than or less than the thickness t of the functional layers 22, 36.

In the example embodiments of FIGS. 2-4, the gasket 20 consists of only the functional layers 22, 36, the single stopper 46, and distance layer 54. In this case, the stopper 46 and the distance layer 54 are the only components disposed between the functional layers 22, 36. However, the gasket 20 could include additional layers.

As shown in FIG. 1-4, either the stopper 46 or the distance layer 54 of the gasket 20 is typically cranked or coined to achieve the desired compression and loading on the full beads 32, 38. Alternatively, the stopper 46 or the distance layer 54 of the gasket 20 is both cranked and coined to achieve the desired compression and loading on the full beads 32, 38. In the exemplary embodiment of FIG. 1, the stopper 46 is cranked toward the first functional layer 22. In this case, the stopper 46 is bent in two different directions to provide a step 60 disposed at an angle relative to the adjacent planar regions of the stopper 46. The fold over 52 in combination with the step 60 of the stopper 46 provides different thicknesses t between the functional layers 22, 36 to achieve the desired performance. Alternatively, the stopper 46 of FIG. 1 could be coined along the fold over 52. In this alternative case, the stopper 46 would have a lower thickness t in the coined region and a greater thickness t extending from adjacent the coined region to the sixth edge 50. In yet another alternate embodiment (not shown), the stopper 46 is both cranked and coined. In this embodiment, the step 60 would be located in the same position as shown in FIG. 1, and the coined region would extend along the fold over 56. More specifically, the coined region of the stopper 46 would extend from the step 60 to the fifth edge 48.

In the exemplary embodiment of FIG. 2, the distance layer 54 is cranked and the stopper 46 is coined. The distance layer 54 is cranked in a location radially between the fold over 52 of the stopper 46 and the full beads 32, 38 of the functional layers 22, 36. In this case, the distance layer 54 is bent in two different directions to provide a step 62 disposed at an angle relative to the adjacent planar regions of the distance layer 54. The thickness t of the distance layer 54 between the seventh edge 56 and the step 62 is typically less than or equal to the thickness t between the step 62 and the eighth edge 58. For example, the thickness t of the distance layer 54 between the seventh edge 56 and the step 62 is typically 0 to 0.1 mm less than the thickness t between the step 62 and the eighth edge 58. In the embodiment of FIG. 2, the thickness t of the distance layer 54 between the seventh edge 56 and the step 62 is equal to the thickness t between the step 62 and the eighth edge 58. The fold over 52 of the stopper 46 in combination with the step 62 of the distance layer 54 provides different thicknesses t between the functional layers 22, 36 to achieve the desired performance.

Alternatively, as shown in FIGS. 3 and 4, instead of the crank, the distance layer 54 is coined along the fold over 52 of the stopper 46. In this alternative case, the coined region extends from the seventh edge 56 to a location disposed between the fold over 52 and the full beads 32, 38. The thickness t of the coined region of the distance layer 54 is typically less than or equal to the thickness t between the coined region and the eighth edge 58. For example, the thickness t of the coined region of the distance layer 54 is typically 0 to 0.1 mm less than the thickness t between the coined region and the eighth edge 58. In the embodiment of FIGS. 3 and 4, the thickness t of the coined region is less than the thickness t between the coined region and the eighth edge 58. Alternatively, the distance layer 54 of FIGS. 3 and 4 could be cranked (instead of coined) along the fold over 52 of the stopper 46, as in FIG. 2.

In yet another alternate embodiment (not shown), the distance layer 54 is both cranked and coined. In this embodiment, the step 62 would be located in the same position as shown in FIG. 2, and the coined region would extend along the fold over 52. More specifically, the coined region of the distance layer 54 would extend from the step 62 to the seventh edge 56. In this case, the thickness t along the coined region between the seventh edge 56 and step 62 would be less than or equal to the thickness t of the remaining portion of the distance layer 54, for example 0 to 0.1 mm less than the thickness t of the remaining portion of the distance layer 54.

The method of manufacturing the gasket 20 typically includes welding or clinching the stopper 46 with the fold over 52 to one of the functional layers 22, 36 and/or the distance layer 54. Alternatively, the stopper 46 can be attached using other methods. In addition, although not shown, the gasket 20 could include multiple sets of the functional layers 22, 36, stopper 46, and optional distance layer 54 stacked on top of one another.

Figure 5:
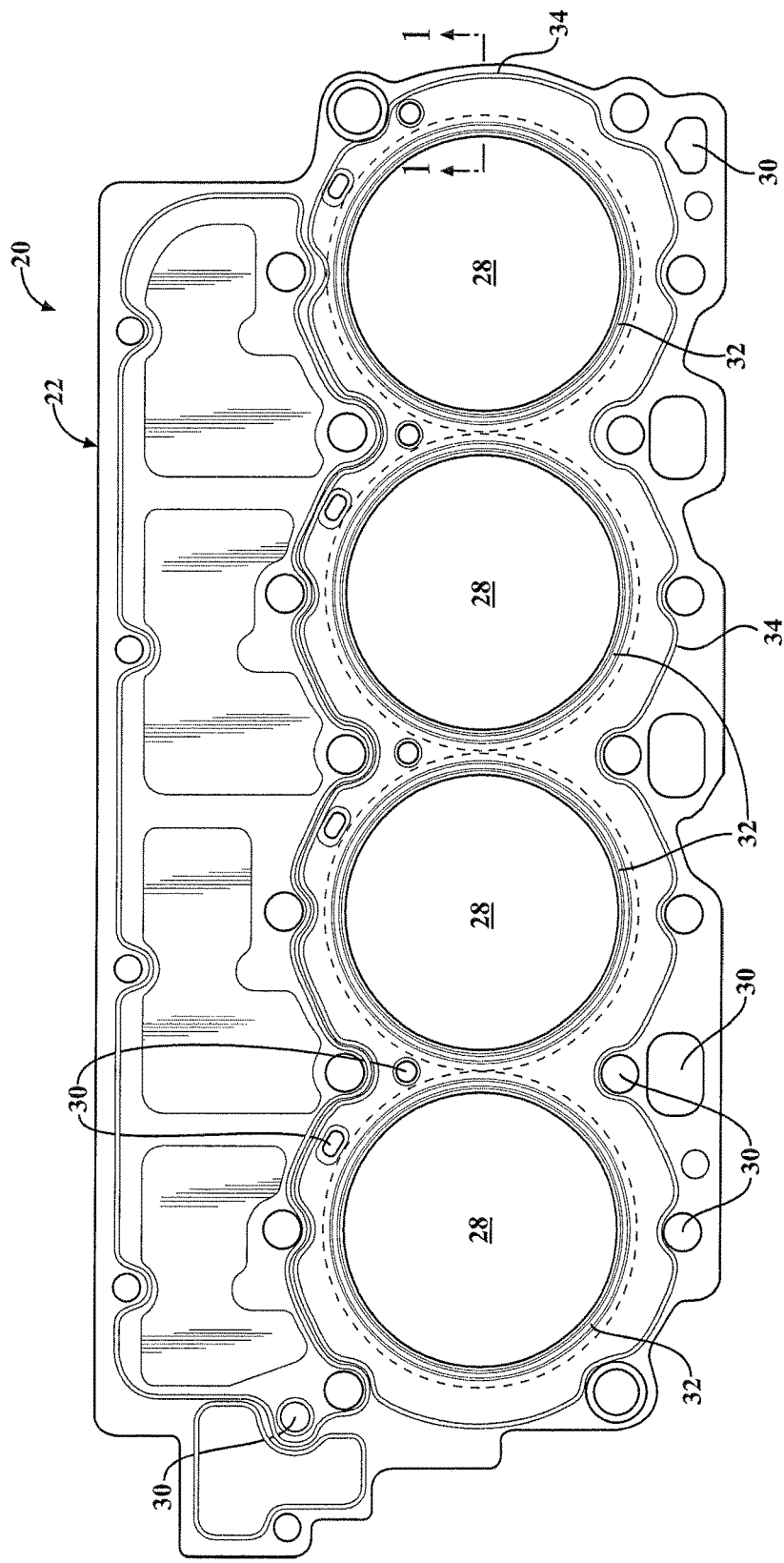
FIG. 5 is a top view of the exemplary cylinder head gasket of FIG. 1, wherein the cross-section shown in FIG. 1 is taken along line 1-1 of FIG. 5.

The gasket 20 typically includes multiple combustion chamber openings 28, each surrounded by the full beads 32, 38. FIG. 5 is a top view of the exemplary gasket 20 of FIG. 1 showing four combustion chamber openings 28 each having a cylindrical shape. However, the gasket 20 could include any number of combustion chamber openings 28, depending on the engine for which the gasket 20 is designed, and those combustion chamber openings 28 could comprise another shape. The exemplary gasket 20 of FIG. 5 also includes other types of openings 30, in addition to the combustion chamber opening 28, such as oil feed holes, coolant metering holes, bolt holes, and oil drain back holes. The half beads 34, 40 typically surround at least some of the other openings 30.

The functional layers 22, 36, stopper 46, and optional distance layer 54 of the gasket 20 are typically formed of a steel material, such as a steel material including chromium and nickel. Exemplary materials include SS301 fully hardened spring stainless steel material, cold rolled stainless steel, or SS304 annealed stainless steel. Alternatively, the functional layers 22, 36, stopper 46, and optional distance layer 54 of the gasket 20 could be formed of another metal or non-metal material. Also, although not shown, the location of the stopper 46 and distance layer 54 could be reversed. The direction of the beads 32, 34, 38, 40 could also be reversed.

Obviously, many modifications and variations of the present invention are possible in light of the above teachings and may be practiced otherwise than as specifically described while within the scope of the following claims.

What is claimed is:

1. A gasket, comprising:
   a first functional layer extending from a first edge surrounding a combustion chamber opening to a second edge;
   a portion of said first functional layer extending in a first direction to present a first full bead around said combustion chamber opening;
   a portion of said first functional layer extending in said first direction to present a first half bead disposed between said first full bead and said second edge;
   a second functional layer extending from a third edge surrounding said combustion chamber opening to a fourth edge;
   a portion of said second functional layer extending in a second direction opposite said first direction to present a second full bead axially aligned with said first full bead;
   a portion of said second functional layer extending in said second direction to present a second half bead axially aligned with said first half bead;

a stopper disposed between said functional layers and extending between a fifth edge and a sixth edge, wherein said sixth edge is disposed radially between said full beads and said half beads;

said stopper including a fold over with planar surface brought into abutment with one another, said fold over presenting an increased thickness between said fifth edge and said full beads relative to a portion of said stopper located adjacent said fold over, wherein said thickness of said fold over is less than two times said thickness of said portion of said stopper located adjacent said fold over; and said stopper includes a step and/or is coined in a location disposed radially between said fold over and said full beads and wherein said stopper is the only component disposed between said functional layers.

2. A gasket according to claim 1, wherein each of said full beads includes a concave surface.

3. A gasket according to claim 1, wherein each of said functional layers is bent at an angle to present said half beads.

4. A gasket according to claim 1, wherein said gasket consists of said first functional layer, said second functional layer, and said stopper;

said functional layers and said stopper each present a thickness and said thickness of said stopper is less than said thickness of said first functional layer and less than said thickness of said second functional layer; and said stopper includes a step between said fold over and said full beads.

5. A gasket according to claim 4, wherein said first functional layer extends outwardly to present said first full bead, and said first full bead includes a convex outer surface and a concave inner surface;

said first functional layer extends outwardly and is bent at an angle to present said first half bead;

said second functional layer extends outwardly to present said second full bead, and said second full bead includes a concave inner surface and a convex outer surface; and said second functional layer extends outwardly and is bent at an angle to present said second half bead.

6. A method of manufacturing a gasket, comprising the steps of:

providing a first functional layer extending from a first edge surrounding a combustion chamber opening to a second edge, wherein a portion of the first functional layer extends in a first direction to present a first full bead around the combustion chamber opening, and a portion of the first functional layer extends in the first direction to present a first half bead disposed between the first full bead and the second edge;

providing a second functional layer extending from a third edge surrounding the combustion chamber opening to a fourth edge, wherein a portion of the second functional layer extends in a second direction opposite the first direction to present a second full bead axially aligned with the first full bead, and a portion of the second functional layer extends in the second direction to present a second half bead axially aligned with the first half bead; and disposing a stopper between the functional layers, wherein the stopper extends between a fifth edge and a sixth edge, the sixth edge is disposed radially between the full beads and the half beads, the stopper includes a fold over having planar surface brought into abutment with one another, the fold over presenting an increased thickness between the fifth edge and the full beads relative to a portion of the stopper located adjacent the fold over, with the thickness of the fold over being less than two times the thickness of the portion of the stopper located adjacent the fold over, and the stopper includes a step and/or is coined in a location disposed radially between the fold over and the full beads;

and wherein said stopper is the only component disposed between said functional layers.

* * * * *